United States Patent [19]
Konik et al.

[11] 3,823,490
[45] July 16, 1974

[54] ADAPTIVE DIAGNOSTIC AID CONSOLE FOR SYSTEM MAINTENANCE

[75] Inventors: Edward H. Konik, Burlington; Stanley C. Drozd, Marblehead, both of Mass.; Charles W. Small, Derry, N.H.; Robert W. Stuart, Bedford, Mass.; Richard E. Cox, Lynn, Mass.; William R. Dery, Georgetown, Mass.

[73] Assignee: Dynamics Research Corporation, Wilmington, Mass.

[22] Filed: Oct. 20, 1971

[21] Appl. No.: 190,701

[52] U.S. Cl............................ 35/10, 35/9 A, 35/13
[51] Int. Cl. ............................................. G09b 7/00
[58] Field of Search............ 35/6, 8 R, 9 R, 9 A, 10, 35/13, 30, 8 A, 9 B, 48 R; 340/172.5

[56] References Cited
UNITED STATES PATENTS

| | | | |
|---|---|---|---|
| 3,077,580 | 2/1963 | Underwood ..................... | 340/172.5 |
| 3,141,243 | 7/1964 | Chapman et al..................... | 35/9 A |
| 3,191,315 | 6/1965 | Hannah................................. | 35/9 A |
| 3,271,745 | 9/1966 | Schauer .......................... | 35/9 R X |
| 3,355,818 | 12/1967 | Whitehorn........................... | 35/9 A |
| 3,355,819 | 12/1967 | Hannah et al. ....................... | 35/9 A |
| 3,504,447 | 4/1970 | Brudner ............................... | 35/9 B |
| 3,584,396 | 6/1971 | Hannah et al. ....................... | 35/9 A |
| 3,608,208 | 9/1971 | Willardson............................ | 35/9 A |
| 3,629,956 | 12/1971 | Thomas et al. ...................... | 35/9 A |

Primary Examiner—Joseph S. Reich
Assistant Examiner—Vance Y. Hum
Attorney, Agent, or Firm—Weingarten, Maxham & Schurgin

[57] ABSTRACT

An adaptive diagnostic aid console for system maintenance. The console employs a microfilm strip in order to present a visual display of maintenance instructions. Each instruction set, when followed, leads to an operator made decision between predetermined alternatives. The operator indicates the decision to the console which responds by automatically stepping to a corresponding point on the microfilm strip to display a further set of instructions leading to a corresponding decision. System trouble is ultimately spotted by narrowing in on the difficulty with this organized and rapid approach.

6 Claims, 6 Drawing Figures

ADAPTIVE DIAGNOSTIC AID CONSOLE FOR SYSTEM MAINTENANCE

FIELD OF THE INVENTION

This invention relates to automatic adaptive maintenance aids and in particular to automated visual guides for stepping through check out routines where each routine is selected on the basis of a decision made during a previous routine.

BACKGROUND OF THE INVENTION

Modern equipment complexity has caused severe maintenance problems to exist in large military and industrial systems and enormously increased the maintenance burden while reducing available equipment operating time. Maintenance and other manuals are frequently in error and poorly organized, making them cumbersome tools for maintenance personnel attempting to provide efficient repair. Not infrequently several volumes of manuals must be consulted for even simple repairs with no indication of where to begin investigating system trouble or what sequence of check out steps should be followed. To provide efficient maintenance, it is thus necessary to provide personnel thoroughly familiar with system structure and operations. There is, however, a critical lack of experienced and trained maintenance personnel available for use in maintaining these complex systems. Even where manuals are written to contain check out routines, the processes of manually looking up data for each step is awkward and time consuming, and subject to operator error. For complex systems such check out routines can be voluminous and costly to store.

In applications, both military and commercial, where large scale computer processing is employed, diagnostic programming is commonly used to check system performance and attempt to isolate malfunctions. While these diagnostic routines are enormously valuable, there are many classes of malfunctions where they are of little or no utility. One such example would be where the malfunction prevents accurate operation of the diagnostic program. In such cases, a lengthy and difficult manual check out is required to repair the equipment.

BRIEF SUMMARY OF THE INVENTION

These and other maintenance shortcomings are overcome by an automated adaptive diagnostic aid console for system maintenance which provides rapid access to maintenance information when written in a logical sequence tailored to step by step system diagnosis. The diagnostic aid console enables inexperienced personnel to efficiently maintain complex systems and further provide for relative ease in updating maintenance information.

In a preferred embodiment of the invention, a diagnostic aid console operates with a microfilm strip having a plurality of adjacent image frames containing diagnostic instructions keyed to system pictures and charts and requiring for each step a decision between predetermined test results. In adjacent data bands on the microfilm strip, information is encoded indicating the address of each image frame in a numerically increasing sequence for the strip and indicating the address of further image frames whose instructions and test steps are logical, sequential check outs depending upon the decision made in the adjacent test frame.

The microfilm is contained in a cassette adapted for application to the console. The console has optics adapted to enlarge and display the image on the microfilm strip and contains electronics that respond to the information encoded in indicia on the data bands to store the address of the display frame and addresses to which the operator is directed by decisions required in the displayed frame. A keyboard enables the operator to communicate his decision to the system and automatic drive circuitry within the console rapidly advances the film to the image frame directed by the operator decision. A double check of positioning accuracy is provided by a comparison between desired address and address actually achieved with subsequent repositioning if error has occurred.

DESCRIPTION OF THE DRAWINGS

A more complete understanding of the present invention may be obtained by referring to the below detailed description of a preferred embodiment presented for purposes of illustration, and not by way of limitation, and to the accompanying drawings of which.

DETAILED DESCRIPTION OF A PREFERRED EMBODIMENT

Electronic system maintenance in the sophisticated and complex control and processing applications has become a major problem in industrial and military applications. Particularly significant is lost operating time for expensive systems where it is impractical or uneconomical to maintain duplicate or redundant systems. It thus becomes an important goal to increase the speed and efficiency of performing maintenance operations wherever malfunctions may occur, in the field or in the laboratory.

Figure 1A:
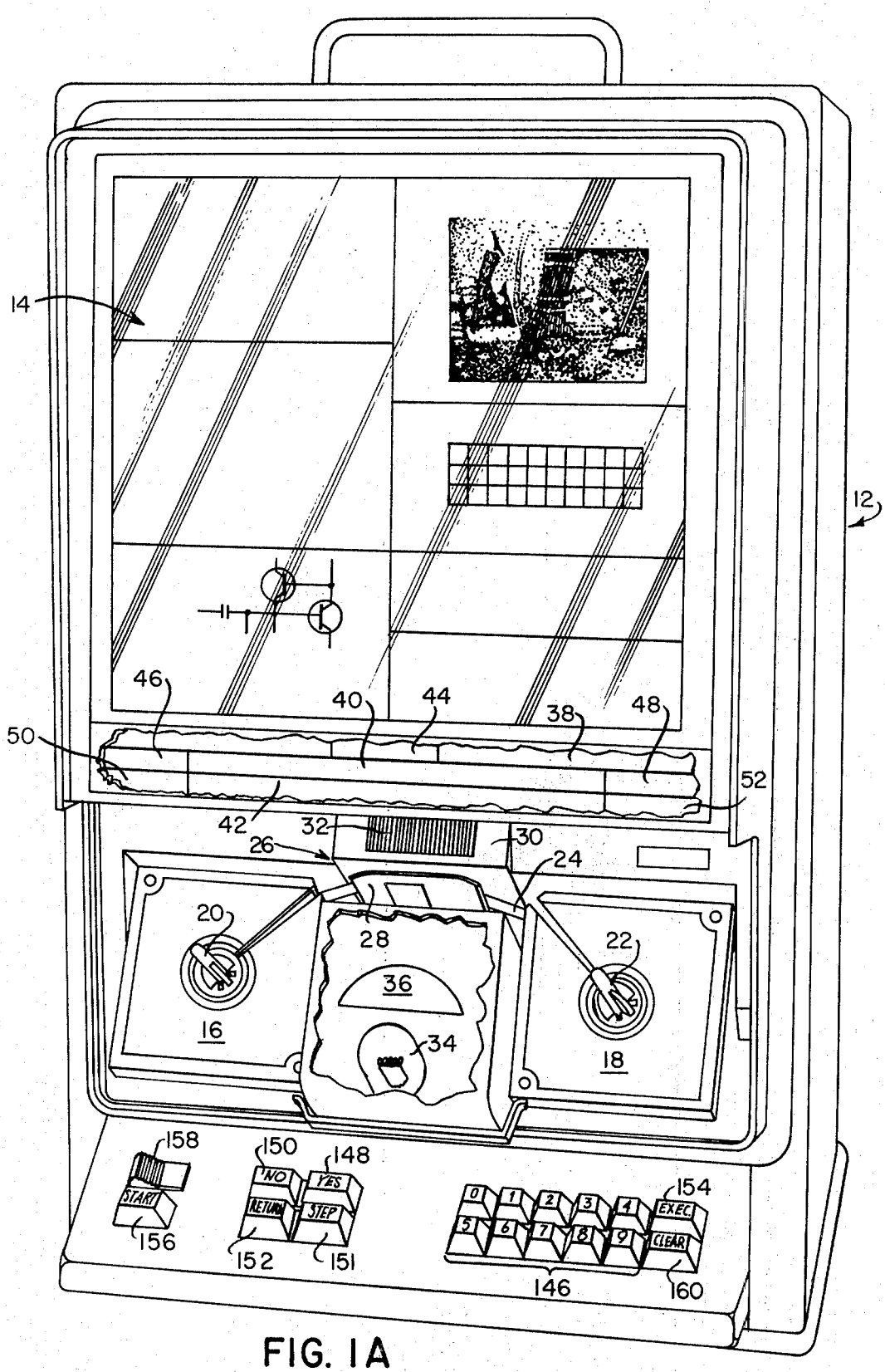
FIGS. 1A, 1B and 1C are pictorial and diagrammatic views of an adaptive diagnostic aid console according to the invention.

According to a preferred embodiment of the invention, a portable, adaptive diagnostic aid console for system maintenance, indicated in FIG. 1A, provides automation of a logical and organized approach to system diagnosis, allowing relatively untrained personnel to rapidly locate and correct system malfunctions. In FIG. 1A a portable console 12 has an upper, front facing projection screen 14 which displays images contained on microfilm in microfilm cassettes 16 and 18. The cassettes 16 and 18 fit upon respective drive spindles 20 and 22 whereby a strip of microfilm 24 is moved between the cartridges 16 and 18 through a projection station 26. A pressure plate 28 holds the strip of microfilm 24 against an optical system 30 having a focus knob 32. Light is projected through the microfilm and optical system 30 to a mirror, described below, which directs illumination to a focus on the screen 14. The light originates from a bulb 34 and is concentrated by a condenser 36 before passing through an aperture in the pressure plate 28 to illuminate the microfilm strip 24.

A lower portion of the screen 14 is obscured from view but has arranged thereon innerfacing photodetectors positioned to receive illumination from the microfilm strip 24 along imaginary, horizontal bands 38, 40 and 42. For illumination in the band 38 a single photodetector 44 is positioned centrally between the vertical edges of the screen 14. Two photodetectors 46 and 48 are positioned to receive radiation in the band 40 adjacent respective left- and right-hand edges of the screen 14. Photodetectors 50 and 52 are similarly located on opposite edges of the screen 14 to receive radiation in the band 42.

Figure 1B:
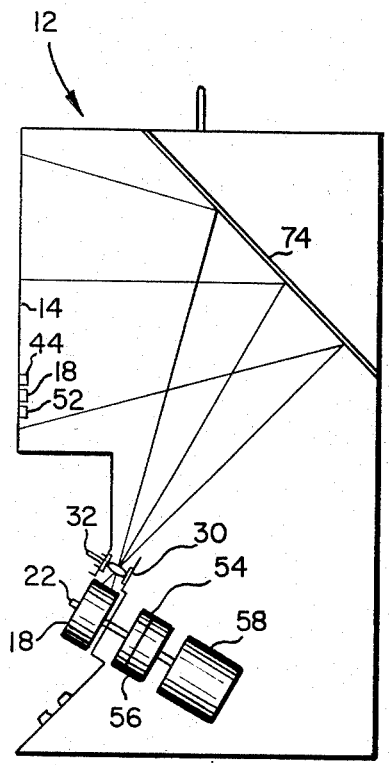
Figure 1C:
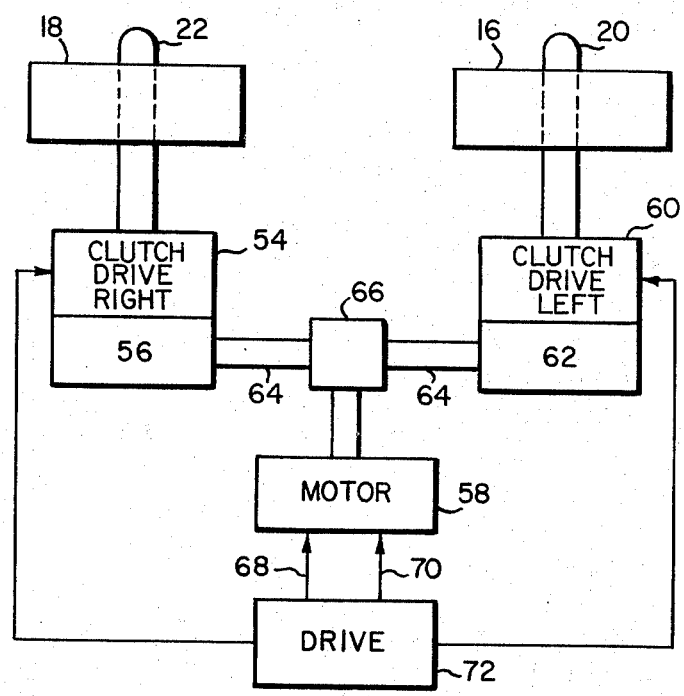

A diagrammatic side view of the console 12 is indicated in FIG. 1B from the viewer's right-hand side. The cassette 18 is indicated on spindle 22 which is driven from an electrically actuable clutch 54 through a right angle coupler 56 fed from a motor 58. In FIG. 1C the drive mechanism is more clearly indicated in a pictorial view showing both cassettes 16 and 18 and spindle shafts 20 and 22. A clutch 60 drives the shaft 20 from a right angle drive 62. The right angle drives 56 and 62 are excited by a shaft 64 which is, in turn, rotated by further right angle drive 66 in response to the rotation of the motor 58. The motor 58 is supplied with first and second levels of excitation 68 and 70 from a driver 72 to produce different rates of drive to the spindles 20 and 22. The driver 72 also provides selective actuation signals to the clutch mechanisms 54 and 60 so as to drive either the spindle 20 or the spindle 22 in accordance with selected direction of drive for the microfilm strip.

Returning now to FIG. 1B, light directed through the microfilm strip 24 is imaged by the optical system 30 and directed toward a mirror 74 which reflects the radiation to a focus on the screen 14 and the photo cells within the bands 38, 40 and 42. The optical system 30 is mounted to allow axial displacement by rotation of the focusing knob 32 thereby to adjust the focus of indicia on the microfilm strip 24 as imaged on the screen 14.

Figure 2:
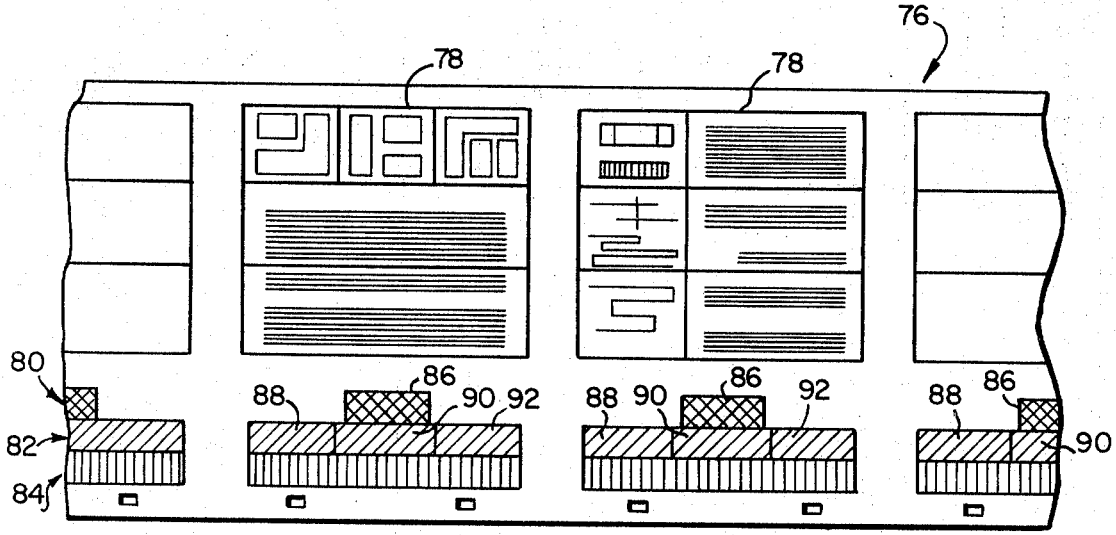
FIG. 2 is a diagrammatic view of a section of a microfilm strip used in the invention and indicating the pattern of information placement on the strip.

The imaginary bands 38, 40 and 42 on the obscured portion of the screen 14 correspond to bands of digitally encoded data on the microfilm strip 24. The data is sensed by the photodetectors 44, 46, 48, 50 and 52 to provide control or sequencing information as described below. The data sensing and projection systems will be better understood by reference to FIG. 2 indicating the film information formatting. In FIG. 2 a portion of a microfilm strip 76 has a plurality of image frames 78 which contain photographs of check out instructions and associated signal waveforms, voltage levels, and equipment pictures with diagrams that have appropriately labelled test points and control points. A parallel set of three data bands 80, 82 and 84, enlarged for clarity, run the length of the strip 76 and contain binary control data coded in optical indicia. In particular, the indicia 86 is located along band 80 adjacent the bottom center of each frame 78 to mark the presence of each frame, or its passage, when the microfilm strip is being driven. In data bands 82 there are three binary coded addresses 88, 90 and 92 located adjacent each image frame. The indicia in the portion 88 indicate the numerical address of the adjacent image frame 78 according to a numerical addressing sequence which increases one digit per frame from beginning to end of the microfilm strip 76. Within each image frame a series of instructions and tests are specified and when performed lead to a decision by the operator, normally between "YES" and "NO" alternatives.

A "YES" response indicates further check out should most efficiently proceed to a predetermined set of subsequent test procedures beginning at a frame whose address is in portion 90 while a "NO" response usually indicates that a different set of test procedures should be followed beginning with a frame having its address in portion 92. While a greater number of decision alternatives may be employed according to the desires of the author of the check out routine by simple modification of the format, a "YES" and "NO" decision alternative has been found convenient and effective. The band 84 contains indicia coextensive with the portions 88, 90 and 92 which provide clocking to establish proper sampling intervals for the data in the portions 88, 90 and 92, regardless of microfilm drive speed.

Returning now to FIGS. 1A and 1B, and keeping in mind the format of FIG. 2, the significance of the photodetectors 44, 46, 48, 50 and 52 in association with the projected image of the data bands 80, 82 and 84 can be appreciated. The photodetector 44 is centrally located to detect the passage of indicia 86 and corresponding to denote the passage of each frame 78. The photodetectors 46 and 48 are positioned to sense the address indicia 88, 90 and 92 in the band 82 ahead of the corresponding frame 78 in either direction of film travel. The photodetectors 50 and 52 are similarly positioned to sense clocking indicia in the band 84 at the same point at which the band 82 indicia are sensed for either direction of film motion.

Figure 3:
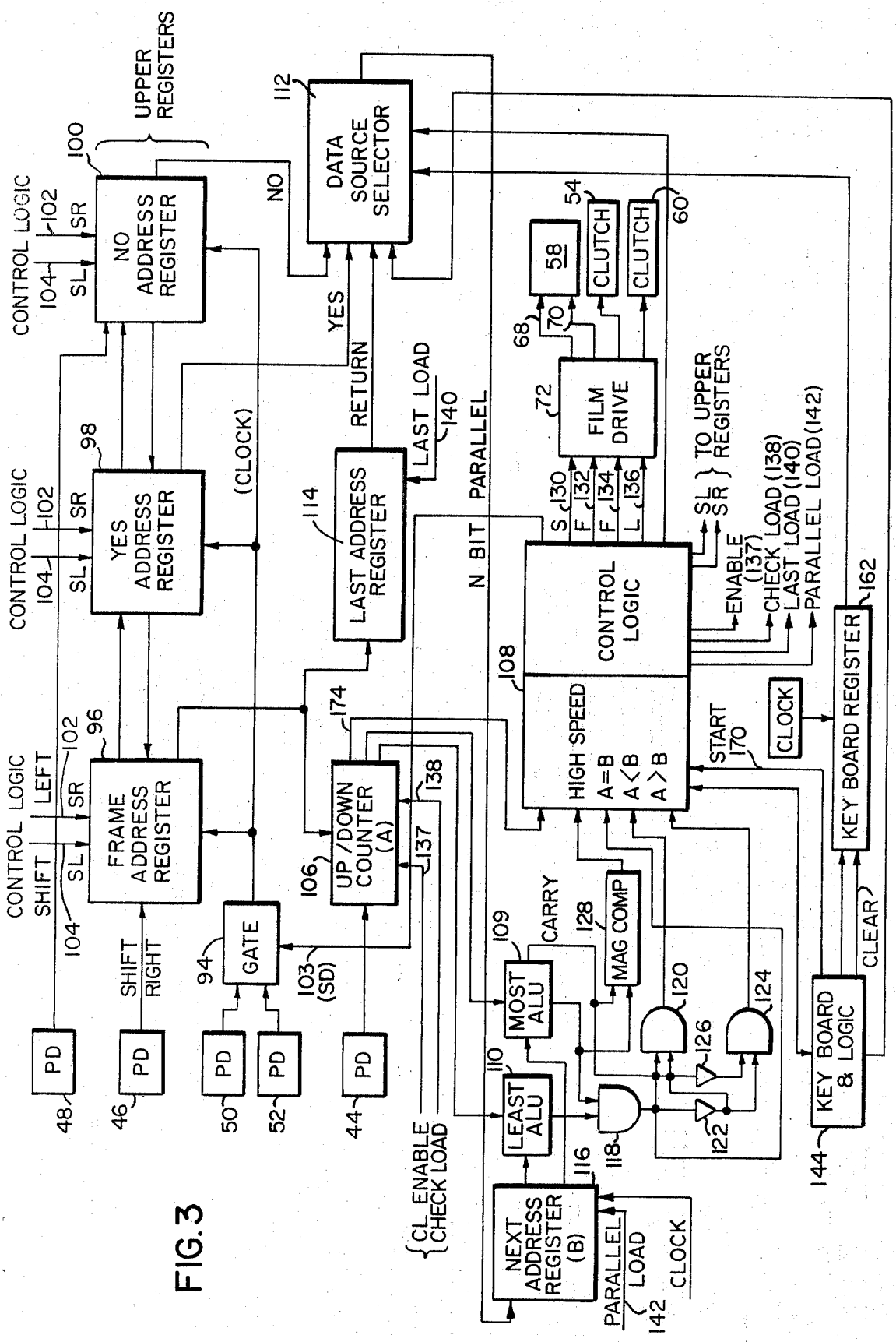
FIG. 3 is a partial block and partial schematic diagram of electronics for providing controlled operation of the diagnostic aid console.

Referring now to FIG. 3 and the control electronics, the outputs of the photodetectors 50 and 52 are fed to a gate 94 which selects the appropriate photosensor depending upon film direction.

To utilize detected address data a series of three bidirectional shift registers 96, 98 and 100 are provided and respectively identified as the "FRAME," "YES" and "NO" address registers. Digital data signals from the photodetector 46 are fed to the input of "FRAME" register 96 which is connected with the "YES" and "NO" registers to form a continuous shift register. During image motion to the right, registers 96, 98 and 100 receive a right indicating shift signal on a line 102. Clocking signals are selected from the appropriate photodetector 50 and 52 by gate 94 in response to a shift direction signal on a line 103 and are fed to each address register to cause a data shift coincident with each clock indicia detected on the moving film irrespective of film rate. Once the entire set of clock signals and data signals corresponding to one image frame have passed beneath the right photodetectors 46 and 50, the registers 96, 98 and 100 will, respectively, contain the "FRAME" address for the displayed image frame encoded in the portion 88, the "YES" address encoded in the portion 90, and the "NO" address encoded in the portion 92.

During motion of the microfilm image to the left, the photodetector 48 provides data signals from the band 82 to an input of the "NO" address shift register 100. A shift left signal on a line 104 to all the address registers, provides for data shifting in the opposite direction with the result that when a complete set of data in the data bands has passed below photodetectors 48 and 52, the three registers are again loaded with the correct data for the corresponding image frame.

The output of the photodetector 44 is applied to an up/down reversible counter 106. The binary output of the digital counter 106 is applied to system 108. Also, the most significant bits in the output of counter 106 are applied to an arithmetic logic unit 109 and the least significant bits are applied to a further arithmetic logic unit 110.

Parallel state outputs from the registers 96, 98 and 100 are applied to a data source selector 112, and the output of the "FRAME" register 96 is applied as parallel state input to the counter 106 and to a last address register 114. The output of the last register 114 is also applied to the data source selector 112. The selector's output is applied to a next address register 116. The most and least significant bit outputs of the next address register 116 are applied respectively to second inputs of the arithmetic logic units 109 and 110. Respective outputs of the arithmetic logic units 109 and 110 which indicate a condition of bit identity between their inputs are applied to an AND gate 118. The output of the AND gate 118, indicating numerical identity between the data in the counter 106 and next address register 116, is applied to control logic 108. The output of AND gate 118 is also applied through an inverter 122 to one input of a further AND gate 120 and to one input of an AND gate 124. A carry output of the most significant bit arithmetic logic unit 109 is applied to the second input of the AND gate 120 and through an inverter 126 is applied to the second input of the AND gate 124. The carry and identity outputs of the arithmetic logic unit 109 are applied to a magnitude comparator 128.

The output of the AND gate 120, indicating that the count of the counter 106 is less than the address in the register 116, is applied to the control logic 108 along with the output of the AND gate 124, indicating the opposite condition, that the number in the counter 106 is greater than the address in the register 116. The output of the magnitude comparator 128 which indicates that the numbers in the counter 106 and next address register 116 differ by more than a predetermined number, for instance, 8 or 16, is also applied to the control logic 108 to produce high speed film motion.

Outputs of the control logic 108 are fed to the film drive system 72 as low and high voltage, slow and fast drive controls on lines 130 and 132 and left and right drive signals on lines 134 and 136.

The control logic system 108 additionally provides the shift right and shift left signals on lines 102 and 104 to the address registers 96, 98 and 100 indicating whether image motion is right or left to adjust the direction of data shifting. It also provides an enable signal on a line 137 to the reversible counter 106 to allow it to increase or decrease its count in correspondence with the signal applied to it from the photodetector 44. Additionally, a check load input on line 138 is provided to counter 106 from the control logic 108 to cause the counter 106 to respond to the parallel binary input from the address register 96 and change its count to correspond to the address of the register 96. The last address register 114 receives a last load input on a line 140 from the control logic 108 to cause it to be loaded with the address in the frame address register 96, and the next address register 116 receives a parallel load signal on a line 142 from the control logic 108 to cause it to assume the address selected by data source selector 112.

Also in FIG. 3 a keyboard and logic system 144 are provided which respond to manually entered data. The manual inputs to keyboard 144 can best be seen in FIG. 1A. The front panel of the console 12 contains a 0–9 digit entry keyboard 146 for manual entry of new addresses, for example where at the start of a check out routine it may be desirable to provide more than two alternatives. Also provided are "YES" and "NO" decision buttons 148 and 150, a "STEP" increment button 151, a "RETURN" button 152, and an "EXECUTE" button 154. A "START" button 156 is provided along with an "ON-OFF" switch 158 and "CLEAR" button 160. Rewind is provided by entering address "0" and executing.

Addresses entered through the numerical keyboard 146 are fed to a keyboard register 162 where they are provided as one input to data source selector 112. Activation of the "EXECUTE" button 154 causes a signal to be supplied to selector 112 on a line 164 causing the next address register 116 to be loaded with the keyboard entry. Register 162 is reset by "CLEAR" button 160. Other button indications from the keyboard and logic circuit 144 are fed to the control logic system 108, and an interlock signal is applied to the keyboard from the control logic 108 to inhibit the generation of any signals from buttons activated on the keyboard during film driving.

Figure 4:
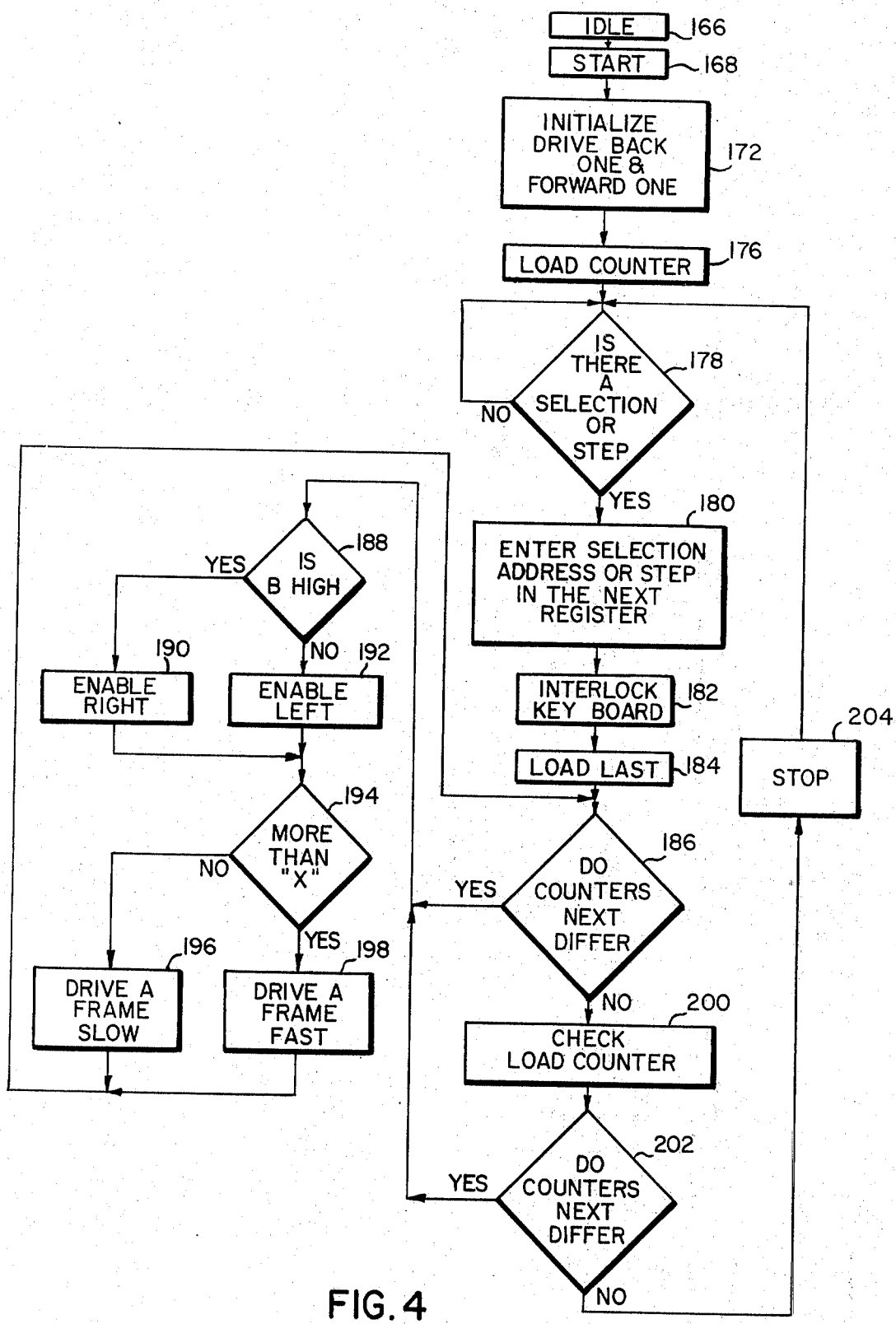
FIG. 4 is a flow chart useful in explaining the operation of the diagnostic aid console.

The operation of the adaptive diagnostic aid console and in particular of the FIG. 3 circuitry and control logic system 108 can best be understood by reference to the flow chart diagram of FIG. 4. From an idle condition 166 after equipment warm up, the system is placed into a start status 168 by activation of the start button 156 on the front panel which generates a corresponding signal fed on a line 170 to the control logic 108. Subsequently an initialize operation 172 within the control logic causes microfilm to be advanced and returned one frame through slow drive signals to the film drive 72 as detected by photodetector pulses to the counter 106 and to the control logic 108 on a line 174. The result is that the address registers 96, 98 and 100 are loaded with the "FRAME," "YES" and "NO" addresses for the image frame being viewed. A subsequent operation 176 activates the check load line 138 and causes the counter 106 to be loaded with the address in the frame register 96. Subsequently a decision 178 tests whether a selection has been made through buttons 148, 150, 151, 152 or 154 having been pressed in the keyboard 144. If no selection has been signaled, decision 178 loops with itself until a selection is indicated at which point an operation 180 enters the selection into the next address register 116 by activation of the parallel load line 142 and continues to an operation 182 which causes control logic 108 to interlock the keyboard to prevent data entry. A subsequent operation 184 loads the last address register 114 with the address of the frame register 96 by activating the last load line 140. Subsequently a decision 186 tests the output of AND gate 118 to determine whether the contents of the counter 106 and of the next address register 116 differ. If there is a difference, a decision 188 is made by testing the outputs of the AND gates 120 and 124 to determine whether the address in the counter 106 is higher or lower than the address in the register 116. If the counter is higher, an operation 190 enables the drive right clutch 54 and shift right line 102, but if the counter is lower an operation 192 enables the drive left clutch 60 and shift left line 104. Subsequently, in either event, a decision 194 is ultimately made determining whether the counter differs from the contents of the next address register by more than a predetermined numerical difference, typically 8, by testing the output of the comparator 128 to identify whether film drive should be at a fast or slow rate. If the difference is not greater than the predetermined difference, an operation 196 enables the counter 106 to respond to pulses from the photodetector 144 and drives the film one frame at the slow pace by applying the low voltage to the line 130 to the film drive 72. If the difference is greater than the predetermined difference, an operation 198 causes a faster frame drive by activating the higher voltage on line 132.

After either operations 196 or 198, decision 186 is reentered. The drive loop will be continued until the counter 106 and the next address register 116 have identity of contents. The resulting negative determination from decision 186 leads to an operation 200 which loads the counter 106 with the address in the frame register 96 and activates a subsequent decision 202 comparing the contents of the counter 106 and next address register 116 for equality again. If a difference is detected, sequencing branches to the decision 188 and continues the drive loop until equality is again checked. If equality is detected, branching returns to the decision 178 through a stop operation 204 which momentarily activates both clutches 54 and 60 to provide fast, dynamic braking of the film drive. The operation 200 and decision 202 provide an additional check that the film has been advanced to the appropriate address in the event that the counter has erroneously detected the passage of image frames.

The flow chart of FIG. 4 indicates a specific sequencing which is preferably accomplished by hard wired logic within the control logic system 108. Accordingly, the order of sequencing can be altered while maintaining operation in accordance with the invention.

From the standpoint of the maintenance operator, the console provides for simple and efficient trouble shooting of vast, sophisticated systems by the branched sequencing of operations specified in the inserted microfilm. By following the instructions and making the decisions called for by the data displayed from the first image frame throughout the entire cassettes, the maintenance technician is guided through specific check out sequences tailored to the conditions of the unit as detected in each step. Malfunctioning components are rapidly located using this organized and automated approach without the need for an experienced technician who can correlate and understand the scattered information in many maintenance manuals. Several frames on a strip of microfilm can be left blank to accommodate future changes in the strip.

Having above described the preferred embodiment of the present invention, it will occur to those skilled in the art that various modifications and alterations to the specific disclosure can be made without departing from the spirit of the invention. While the diagnostic aid system has been presented in an example having two alternative decisions per step, it is clear that any greater number may be used as desired. Accordingly it is intended to limit the scope of the invention only as indicated in the following claims.

What is claimed is:

1. An adaptive diagnostic aid console for system maintenance including:

an image strip having a plurality of visual information frames arranged in adjacent relationship upon said strip, said frames containing maintenance test instructions and an instruction requiring a decision by a maintenance operator between predetermined alternatives;

said image strip further having a plurality of information encoded bands adjacent each said frame and containing indicia representing the address of the adjacent frame on said strip in a sequence of numerically labeled addresses along said strip and the addresses of further frames, one associated with each alternative for the operator decision required by said adjacent frame;

said encoded bands further having indicia indicating the position of each of said frames;

an image strip path having a projection station and being operative to detachably receive said image strip;

means for conveying said image strip along said path;

means for displaying the image in the frame on said image strip at said projection station;

means for sensing the indicia in said plurality of bands;

a reversible counter;

means for changing the count in said reversible counter in correspondence with the sensed passage of indicia in said plurality of bands indicating the position of each said frame during conveyance of said image strip by said conveying means, the change in said counter being in a direction determined by the direction of conveyance of said image strip;

means for storing the sensed addresses associated with each displayed frame;

means for accepting and storing one or more additional frame addresses selected by said operator;

means for enabling said operator to select one of said stored addresses;

means for comparing the addresses represented by the numerical count of said reversible counter with the selected stored address and operative to provide a comparison signal representative thereof;

means for causing said conveying means to convey said image strip in response to said comparison signal to reduce the difference in addresses compared;

position verifying and correction means including:
means for loading said reversible counter with the stored address of the displayed frame in response to said comparison signal indicating the address identity;

means for again operating said comparing means for comparing the displayed frame address loaded in said reversible counter with the selected stored address;

means for causing said conveying means to convey said image strip if the address loaded in said reversible counter is different from the address it replaces;

means for stopping the conveyance of said image strip in response to the comparison signal indicating a condition of identity between the stored address of the displayed frame and the selected stored address.

2. The adaptive diagnostic aid console for system maintenance of claim 1 further including means for augmenting the rate of conveyance of said conveying means in response to said comparison signal having a magnitude greater than a predetermined magnitude.

3. The adaptive diagnostic aid console for system maintenance of claim 1 further including means for accepting and storing the address of the previously displayed frame.

4. The adaptive diagnostic aid console for system maintenance of claim 1 wherein said conveying means is operative to:

convey said strip, one image in a first direction; and convey said strip, one image in an opposite direction whereby said address storing means is initialized to the address of the adjacent image and addresses associated with each decision alternative.

5. The adaptive diagnostic aid console for system maintenance of claim 1 further including means for inhibiting said operator enabling means during conveying of said image strip.

6. The adaptive diagnostic aid console for system maintenance of claim 1 wherein means are provided for compensating for lead and lag in sensed indicia on said plurality of data bands varying with direction of image strip conveyance.

* * * * *